United States Patent Office 2,857,440
Patented Oct. 21, 1958

2,857,440
METHOD FOR PRODUCTION OF ORTHOVINYLTOLUENE

James L. Amos, Midland, Frederick J. Soderquist, Essexville, and Robert H. Allen, Midland, Mich., assignors to The Dow Chemical Company, Midland, Mich., a corporation of Delaware No Drawing. Application June 2, 1955
Serial No. 512,865

13 Claims. (Cl. 260—669)

This invention concerns a new and improved method for the production of ortho-vinyltoluene. It pertains more particularly to a method which involves concurrent formation of ortho-vinyltoluene and a lesser amount of indene and which permits ready separation of these two products from one another.

It is known that vinyl aromatic compounds can be prepared by a pyrolysis of corresponding alkyl aromatic compounds containing two or more carbon atoms in the alkyl group and that either of two kinds of reactions may be involved, depending on the identity of the alkyl aromatic compound employed. The formation of a vinyl aromatic compound from a corresponding ethylbenzene compound involves a dehydrogenation reaction, whereas the formation of a vinyl aromatic compound from a corresponding isopropylbenzene compound involves a demethanation reaction which often is accompanied by extensive occurrence of a dehydrogenation (rather than demethanation) reaction. The pyrolysis of a mono-ethylbenzene compound usually results in dehydrogenation of the ethyl group with formation of a monovinylbenzene compound, e. g. styrene, as the only alkenyl aromatic product. In contrast the pyrolysis of a mono-isopropylated benzene compound usually results in formation of an isopropenylbenzene compound, rather than a vinylbenzene compound, as the principal product, or in formation of a mixture of alkenyl aromatic products, e. g. a mixture of styrene and alpha-methylstyrene. Because of these facts, most monovinyl aromatic compounds can be produced more conveniently, in higher yields and/or in more readily purifiable condition from corresponding monoethylated benzene compounds than from the corresponding monoisopropylated benzene compounds.

It is also known that nuclear methylated styrenes having a methyl group adjacent to the vinyl radical possess desirable properties, not shared to a like extent by isomers thereof having a methyl group in a meta- or para-position, but not ortho to the vinyl radical. For instance, Dixon and Saunders, Ind. Eng. Chem., 46, 652 (1954), disclose that the heat distortion temperatures of polymers of monomethyl- and dimethyl-styrenes having a methyl group ortho to the vinyl radical are much higher than the respective heat distortion temperatures of polymers of monomethyl- and dimethyl-styrenes not having a methyl group ortho to the vinyl radical. They prepared the nuclear methylated styrenes by a catalytic thermal decomposition of corresponding diarylethanes.

Elwell, in U. S. Patent 2,531,327, prepares nuclear methylated styrenes by catalytically dehydrogenating meta- or para-ethyltoluene or 3,4- or 3,5-dimethyl-1-ethylbenzene. He teaches that the ethyltoluene or ethylxylene starting material should contain not more than a minor amount of an isomer thereof having a methyl group ortho to the ethyl group, since such an isomer, if present, reacts to form an indene compound which cannot readily or satisfactorily be separated from the desired vinyl product by fractional distillation. The patent teaches that the indene compound, if formed and retained together with the nuclear methylated styrene product, has a detrimental effect on the properties of solid polymers prepared from the product.

Although a number of isopropylated aromatic compounds have heretofore been thermally decomposed, and paracymene in particular has been pyrolyzed to form para-vinyl-toluene, the thermal decomposition of nuclear methylated propylbenzenes containing a normal-propyl or an isopropyl radical and having a methyl group ortho to the propyl radical has, apparently, not heretofore been investigated.

It has now been found that the pyrolysis of an ortho-propyltoluene can be carried out to obtain results which differ in the following respects from those obtainable by an otherwise similar pyrolysis either of an isopropyltoluene not having the isopropyl radical ortho to the methyl group or of ortho-ethyltoluene. It has been found that either ortho-n-propyltoluene or ortho-isopropyltoluene, especially the latter, can pyrolytically be demethanated to form ortho-vinyltoluene and a relatively small amount of indene as the principal unsaturated organic products, without the nuclear methylated isopropylbenzene compound becoming dehydrogenated to form a corresponding nuclear methylated isopropenylbenzene compound to more than a slight extent. In contrast, the pyrolysis of meta- or para-isopropyltoluene under otherwise similar conditions results in extensive occurrence of a dehydrogenation reaction with formation of a corresponding isopropenyltoluene as a principal product, alone or together with meta- or para-vinyltoluene, and does not result in formation of an indene.

It has further been found that the pyrolysis of an ortho-propyltoluene results in a much higher yield of ortho-vinyltoluene and a considerably lower yield of an indene than are obtained by the pyrolysis of ortho-ethyltoluene under otherwise similar conditions.

It has also been found that the crude reaction mixture resulting from the pyrolysis of an ortho-propyltoluene can be fractionally distilled to separate therefrom the ortho-vinyltoluene and indene products, each in a form substantially free of the other. The unconsumed portion of the ortho-n-propyltoluene, or the ortho-isopropyltoluene, possesses a boiling point between those of the ortho-vinyltoluene and indene products and apparently facilitates the fractionation to separate said products from one another. Ortho-isopropyltoluene is obtainable more readily and at lower cost than ortho-n-propyltoluene and is preferably employed as the starting compound. However, either of these propyltoluenes can be employed in the process of the invention for the production of ortho-vinyltoluene and, if desired, indene.

The ortho-propyltoluene, preferably ortho-isopropyltoluene, is vaporized and passed, alone or together with a diluent gas or vapor, through a reaction zone where it is pyrolyzed at temperatures usually of from 600° to 750° C. and preferably of from 650° to 725° C. in the presence or absence of a dehydrogenation catalyst. The vapors may be heated to the reaction temperature immediately before, or during, passage through the reaction zone. The thermal demethanation of the ortho-isopropyltoluene to form a corresponding ortho-vinyltoluene appears to occur at least as favorably in the absence of a dehydrogenation catalyst as in the presence of such catalyst. However, the yield of indene is usually increased by carrying out the pyrolysis in the presence of a dehydrogenation catalyst over that obtained in the absence of such catalyst under otherwise similar conditions. Any of the well known solid dehydrogenation catalysts, e. g. alumina, silica-alumina mixtures, ferric oxide, chromium oxide, mixtures of ferric oxide and chromium oxide, or mixtures of chromium oxide or ferric oxide or both with a minor amount of potassium oxide can be employed, e. g. as a bed, in the reaction zone for purpose of improving the yield of the indene product.

A substantially non-reactive diluent gas or vapor, if present during the pyrolysis, usually causes a decrease in the yield of an indene and an increase in yield of ortho-vinyltoluene as compared with the yields obtained in the absence of the diluent under otherwise similar conditions. Examples of diluent gases or vapors which may be employed are steam, nitrogen, carbon dioxide, and relatively non-reactive hydrocarbons such as methane, vaporized benzene, or toluene vapors, etc.

The rate of passage of the feed vapors through the reaction zone may be varied widely, but usually is such that from 10 to 80, preferably from 20 to 70, percent of the ortho-propyltoluene is consumed per pass through said zone. For reasons hereinafter explained, it is desirable that a considerable amount, e. g. 20 percent or more, of the ortho-propyltoluene pass through the reaction zone without being consumed. The effluent vapor mixture is cooled to condense the aromatic products and the uncondensed gases, such as methane and hydrogen, are vented from the system. The liquid mixture of organic products is fractionally distilled, preferably under vacuum and in the presence of an added polymerization inhibitor, to separate the ortho-vinyltoluene and indene from one another and from the minor amounts of by-products, such as benzene, toluene, xylene, styrene, propylbenzene and ethyltoluene, etc., which may be present in the crude pyrolysis mixture. The unconsumed ortho-propyltoluene, which is present in large proportion in the distillation mixture, has a boiling point between those of the ortho-vinyltoluene and indene reaction products and facilitates the separation. Apparently, because of the presence of the unconsumed starting material, the indene and ortho-vinyltoluene products are readily separated in the distillation to recover each in a form substantially free of the other.

The following examples describe ways in which the invention has been practiced and illustrate certain of its advantages, but are not to be construed as limiting its scope.

EXAMPLE 1

In each of two experiments, a vapor mixture of one part by weight of an ortho-alkyltoluene and three parts of steam was passed through a bed of a dehydrogenation catalyst at a vapor temperature in the bed of approximately 700° C. The effluent vapors were cooled to condense the steam and the aromatic products and the organic layer of the condensate was separated, weighed, and analyzed. In one of the experiments ortho-ethyltoluene was employed as the ortho-alkyltoluene starting material and in the other experiment ortho-isopropyltoluene was employed as said starting material. Otherwise, the two experiments were carried out under similar conditions. In both experiments, ortho-vinyltoluene and indene were obtained as the principal unsaturated aromatic products, but the yields of these products differed considerably in the two experiments. The following table names the ortho-alkyltoluenes which were employed as starting materials in the respective experiments. It gives, for each experiment, the percent yields of ortho-vinyltoluene and of indene, based both on the amount of the ortho-alkyltoluene fed to the reaction and on the amount of the ortho-alkyltoluene consumed.

*Table I*

| Run No. | o-Alkyltoluene | Percent Yields of— | | | |
|---|---|---|---|---|---|
| | | o-Vinyltoluene, based on amount of the o-alkyltoluene— | | Indene, based on the amount of the o-alkyltoluene— | |
| | | Fed to Reaction | Consumed | Fed to Reaction | Consumed |
| 1 | o-Ethyltoluene | 14.5 | 29.8 | 13.8 | 28.3 |
| 2 | o-Isopropyltoluene | 21.6 | 38.8 | 8.5 | 15.3 |

EXAMPLE 2

In each of several experiments a vapor mixture of ortho-isopropyltoluene and steam in the proportions indicated in the following table was passed through a heated reaction chamber, containing a solid packing material, at a vapor temperature in the chamber of approximately 700° C. The effluent vapors were cooled to condense the steam and the aromatic products and the organic layer of the condensate was separated, weighed, and analyzed. The packing material employed in one of the experiments was a non-catalytic body of porcelain Berl saddles. As packing materials for the reaction chamber in the other experiments there were employed the following respective dehydrogenation catalysts: (A) a catalyst comprising iron oxide, chromium oxide and potassium oxide as its essential ingredients, (B) activated, i. e. calcined, alumina, and (C) a catalytic mixture of silica and alumina. These catalysts will hereinafter be designated by the letters A, B and C, respectively. From the data collected there were calculated, for each experiment, the percent yields of ortho-vinyltoluene and of indene, based both on the amount of ortho-isopropyltoluene fed to the reaction and on the amount of ortho-isopropyltoluene consumed. The table indicates, for each experiment, whether a dehydrogenation catalyst was employed and which of the above catalysts was used, if any. It also gives the ratio by weight of steam to ortho-isopropyltoluene in each feed mixture. It gives the yields of ortho-vinyltoluene and of indene obtained in each experiment. In the table isopropyltoluene is abbreviated as "IPT" and ortho-vinyltoluene is abbreviated as "o-VT."

*Table II*

| Run No. | Catalyst | Wt. Ratio, Percent Steam to IPT | Percent Yields of— | | | |
|---|---|---|---|---|---|---|
| | | | o-VT Based on— | | Indene Based on— | |
| | | | IPT Fed | IPT Consumed | IPT Fed | IPT Consumed |
| 1 | None | 3/1 | 21.4 | 40.3 | 3.9 | 7.4 |
| 2 | A | 3/1 | 21.6 | 38.8 | 8.5 | 15.3 |
| 3 | B | 3/1 | 14.0 | 31.6 | 9.3 | 21.0 |
| 4 | C | 2/1 | 21.7 | 36.1 | 7.9 | 13.1 |

It will be noted that the yield of ortho-vinyltoluene was higher and that of indene lower in the experiment not using a dehydrogenation catalyst than in those wherein a catalyst was employed.

EXAMPLE 3

In each of three experiments, a vapor mixture of one part by weight of one of the isomeric isopropyltoluenes and two parts of steam was fed to a reaction zone where it was heated at a reaction temperature of 700° C. No catalyst was employed. The effluent vapors were cooled to condense the steam and aromatic products and the organic layer of the condensate was separated, weighed, and analyzed. Except for employment of the three isomeric isopropyltoluenes individually in the respective experiments, the experiments were carried out in similar manner. In the experiment in which ortho-isopropyltoluene was pyrolyzed, the unsaturated organic products were ortho-vinyltoluene, styrene and indene, i. e. no isopropenyltoluene was obtained. In the experiment in which meta-isopropyltoluene was pyrolyzed, meta-vinyltoluene and meta-isopropenyltoluene were the principal products and no indene was formed. Similarly, in the pyrolysis of para-isopropyltoluene, the principal products were para-vinyltoluene and para-isopropenyltoluene and no indene was formed. A small amount of styrene was also formed from the para-isopropyltoluene. Table III indicates which of the isomeric isopropyltoluenes was used as a feed material in each experiment and gives the percent yield of each of the above-mentioned unsaturated compounds, based on the amount of isopropyltoluene fed to the reaction. From 38 to 44 percent of the isopropyltoluene remained unconsumed in each experiment. In the table, vinyltoluene is abbreviated as "VT."

*Table III*

| Run No. | Isopropyl-toluene | Percent Yields of— | | | |
|---|---|---|---|---|---|
| | | VT | Isopropenyltoluene | Styrene | Indene |
| 1 | ortho | 23.3 | 0 | 2.6 | 3.6 |
| 2 | meta | 23.2 | 19.3 | 0 | 0 |
| 3 | para | 23.4 | 18.6 | 2.5 | 0 |

*Example 4*

This example illustrates the effect of changes in the proportion of steam used as a diluent in the pyrolysis of ortho-isopropyltoluene. In each of a series of experiments, a vapor mixture of ortho-vinyltoluene and steam in the proportions indicated in Table IV was passed through a reaction chamber, containing a bed of a granular dehydrogenation catalyst, where the vapors were heated to the reaction temperature indicated in the table. The catalyst was that designated as A in Example 2. The effluent vapors were cooled to condense the steam and the aromatic ingredients and the organic layer of the condensate was separated, weighed and analyzed. The proportion of steam in the vapor feed mixture was changed from one experiment to the next. Another series of experiments were carried out in similar manner, except that the reaction chamber contained a bed of non-catalytic Berl saddles as a packing material and no catalyst was employed. Table IV indicates the experiments which employed a catalyst and those in which a catalyst was not used. It gives the reaction temperature determined for each experiment. It also gives the ratio by weight of steam to ortho-isopropyltoluene in each vapor feed mixture. It gives, for each experiment, the percent yields of ortho-vinyltoluene and of indene, based both on the amount of ortho-isopropyltoluene fed to the reaction and on the amount of ortho-isopropyltoluene consumed. The abbreviations employed in Table IV are the same as were used in preceding examples.

*Table IV*

| Run No. | Catalyst Used | Temp., °C. | Wt. Ratio, Steam/o-IPT | Percent Yields of— | | | |
|---|---|---|---|---|---|---|---|
| | | | | o-VT Based on | | Indene Based on | |
| | | | | o-IPT Fed | o-IPT Consumed | o-IPT Fed | o-IPT Consumed |
| 1 | Yes | 700 | 5/1 | 13.1 | 29.6 | 6.3 | 14.3 |
| 2 | Yes | 700 | 3/1 | 21.6 | 38.8 | 8.5 | 15.3 |
| 3 | Yes | 690 | 2/1 | 22.2 | 32.8 | 9.2 | 13.4 |
| 4 | Yes | 695 | 1/1 | 18.6 | 28.5 | 6.4 | 9.8 |
| 5 | No | 700 | 3/1 | 21.4 | 40.3 | 3.9 | 7.4 |
| 6 | No | 700 | 2/1 | 23.3 | 39.4 | 3.6 | 6.1 |
| 7 | No | 700 | 1/1 | 22.5 | 44.8 | 1.1 | 2.2 |
| 8 | No | 670 | 1/2 | 22.4 | 40.3 | 0.9 | 2.1 |
| 9 | No | 670–690 | ¹ 0/1 | 16.5 | 19.8 | 11.1 | 13.3 |

¹ No diluent used.

EXAMPLE 5

This example illustrates the use of steam, nitrogen, and carbon dioxide as diluents in separate experiments on the pyrolysis of ortho-isopropyltoluene. Certain of the pyrolysis reactions were carried out in the presence of a catalyst of the kind employed in runs 1–4 of Table IV, and others were carried out without use of a catalyst. The vapor feed mixture in each experiment consisted of approximately equal parts by weight of ortho-isopropyltoluene and of the diluent named. Otherwise, the procedure in carrying out each experiment and in determining the yields of the ortho-vinyltoluene and indene products was similar to that employed in Example 4. Table V indicates, for each experiment, whether a catalyst was used; the reaction temperature which was determined; the kind of diluent used; and the yield of each of the above-mentioned products, based both on the amount of ortho-isopropyltoluene fed to the pyrolysis reaction and on the amount of ortho-isopropyltoluene consumed.

*Table V*

| Run No. | Catalyst Used | Temp., °C. | Diluent | Percent Yields of— | | | |
|---|---|---|---|---|---|---|---|
| | | | | o-VT Based on— | | Indene Based on— | |
| | | | | o-IPT Fed | o-IPT Consumed | o-IPT Fed | o-IPT Consumed |
| 1 | Yes | 688 | Steam | 21.4 | 31.5 | 8.7 | 12.8 |
| 2 | Yes | 685 | $N_2$ | 20.9 | 46.8 | 0.8 | 1.8 |
| 3 | Yes | 670 | $CO_2$ | 25.5 | 43.1 | 1.6 | 2.7 |
| 4 | No | 700 | Steam | 22.5 | 44.8 | 1.1 | 2.2 |
| 5 | No | 685 | $N_2$ | 26.1 | 46.5 | 1.5 | 3.4 |
| 6 | No | 670 | $CO_2$ | 31.7 | 46.8 | 2.4 | 3.5 |

It will be noted that the effect of the catalyst on the yields of the products was greater in the experiments in which steam was used as a diluent than in those in which nitrogen and carbon dioxide were employed. This is believed to be because the particular catalyst which was employed was more active in the presence of steam than when using the other diluents.

EXAMPLE 6

A vapor mixture of three parts by weight of steam and one part of ortho-n-propyltoluene was passed through a reaction chamber where it was heated to a temperature of 700° C. The reaction chamber contained a bed of a non-catalytic packing material and no catalyst was used. The effluent vapors were cooled to condense the steam and aromatic products and the organic layer of the condensate was separated, weighed, and analyzed. Table VI names and gives the yields of the unsaturated aromatic products that were obtained in each experiment. The percent yield of each product is given both on a basis of the amount of ortho-n-propyltoluene which was fed to the reaction and on a basis of the amount of said compound consumed. In the table ortho-n-propyltoluene is abbreviated as "o-PT."

*Table VI*

| Styrene, Percent Yield on o-PT | | Beta-Methylstyrene, Percent Yield on o-PT | | o-Vinyltoluene, Percent Yield on o-PT | |
|---|---|---|---|---|---|
| Fed | Consumed | Fed | Consumed | Fed | Consumed |
| 0.5 | 1.0 | 1.0 | 2.1 | 19.1 | 40.1 |

We claim:

1. A method which comprises thermally decomposing an ortho-propyltoluene by passing vapors thereof through a zone where they are heated at a reaction temperature for a time such that only part of the ortho-propyltoluene is consumed with formation of a mixture comprising unconsumed ortho-propyltoluene together with ortho-vinyltoluene as the major reaction product and indene as a minor product, which mixture contains little to none of a propenyltoluene, the yield of propenyltoluene being less than is formed by thermally decomposing meta- and para-ispropyltoluenes under otherwise similar conditions.

2. A method which comprises passing vapors of an ortho-propyltoluene through a reaction zone where they are heated at reaction temperatures between 600° and 750° C. at a rate of vapor flow such that from 10 to 80 percent of the ortho-propyltoluene is consumed during passage through said zone, whereby ortho-vinyltoluene and a lesser amount of indene and from none to only small amount of propenyltoluene are formed, the yield of propenyltoluene being less than is formed from meta- and para-isopropyltoluenes under otherwise similar reaction conditions, cooling the effluent vapors, which comprises these products and unconsumed ortho-propyltoluene, to condense aromatic ingredients therefrom, and fractionally distilling the mixture of aromatic ingredients to separate the ortho-vinyltoluene in a form substantially free of the indene.

3. A method, as claimed in claim 2, wherein the vapors which are fed to the reaction zone are a vapor mixture of one part by weight of the ortho-propyltoluene and at least 0.5 part of an inert diluent and the vapor mixture is heated to a reaction temperature between 650° and 725° C. during flow through said zone.

4. A method, as claimed in claim 3, wherein the vapor mixture is heated to the reaction temperature in the absence of a dehydrogenation catalyst.

5. A method, as claimed in claim 3, wherein the diluent is steam and the vapor mixture is heated to the reaction temperature in the presence of a solid dehydrogenation catalyst.

6. A method which comprises passing vapors of ortho-n-propyltoluene through a reaction zone, where they are heated at reaction temperatures between 600° and 750° C., at a rate of vapor flow such that from 20 to 70 percent of the ortho-n-propyltoluene is consumed during passage through said zone, whereby ortho-vinyltoluene and a lesser amount of indene and from none to only small amount of propenyltoluene are formed, the yield of propenyltoluene being less than is formed from meta- and para-isopropyltoluenes under otherwise similar reaction conditions, cooling the effluent vapors, which comprises these products and unconsumed ortho-propyltoluene, to condense the aromatic ingredients, and fractionally distilling the mixture of aromatic ingredients to separate the ortho-vinyltoluene in a form substantially free of the indene.

7. A method, as claimed in claim 6, wherein the vapors which are fed to the reaction zone are a vapor mixture of one part by weight of the ortho-n-propyltoluene and at least 0.5 part of an inert diluent and the vapor mixture is heated to a reaction temperature between 650° and 725° C. during flow through said zone.

8. A method, as claimed in claim 7, wherein the vapor mixture is heated to the reaction temperature in the absence of a dehydrogenation catalyst.

9. A method, as claimed in claim 7, wherein the diluent is steam and the vapor mixture is heated to the reaction temperature in the presence of a solid dehydrogenation catalyst.

10. A method which comprises passing vapors of ortho-isopropyltoluene through a reaction zone, where they are heated at reaction temperatures between 600° to 750° C., at a rate of vapor flow such that from 20 to 70 percent of the ortho-isopropyltoluene is consumed during passage through said zone, whereby ortho-vinyltoluene and a lesser amount of indene and from none to only small amount of propenyltoluene are formed, the yield of propenyltoluene being less than is formed from meta- and para-isopropyltoluenes under otherwise similar reaction conditions, cooling the effluent vapors, which comprises these products and unconsumed ortho-propyltoluene, to condense the aromatic ingredients, and fractionally distilling the mixture of aromatic ingredients to separate the ortho-vinyltoluene in a form substantially free of the indene.

11. A method, as claimed in claim 10, wherein the vapors which are fed to the reaction zone are a vapor mixture of one part by weight of the ortho-isopropyltoluene and at least 0.5 part of an inert diluent and the vapor mixture is heated ot a reaction temperature between 650° and 725° C. during flow through said zone.

12. A method, as claimed in claim 11, wherein the vapor mixture is heated to the reaction temperature in the absence of a dehydrogenation catalyst.

13. A method, as claimed in claim 11, wherein the diluent is steam and the vapor mixture is heated to the reaction temperature in the presence of a solid dehydrogenation catalyst.

References Cited in the file of this patent

UNITED STATES PATENTS

| | | |
|---|---|---|
| 1,541,175 | Ostromislensky et al. | June 9, 1925 |
| 2,531,327 | Elwell | Nov. 21, 1950 |

OTHER REFERENCES

Pines et al., J. Am. Chem. Soc., vol. 70 (1948), pages 533–37 (page 533 only needed).

"Handbook of Chemistry and Physics," 35th edition (Cleveland: Chemical Rubber Publishing Co., 1953), page 874.